(12) United States Patent
Walters et al.

(10) Patent No.: US 12,712,798 B2
(45) Date of Patent: Aug. 18, 2026

(54) SYSTEM FOR CREATING RANDOMIZED SCALED TESTING

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 278 days.

(21) Appl. No.: 18/365,330

(22) Filed: Aug. 4, 2023

(65) Prior Publication Data

US 2023/0388212 A1 Nov. 30, 2023

Related U.S. Application Data

(62) Division of application No. 17/346,857, filed on Jun. 14, 2021, now Pat. No. 11,765,063.

(51) Int. Cl.

| | |
|---|---|
| ***H04L 43/16*** | (2022.01) |
| ***H04L 43/0817*** | (2022.01) |
| ***H04L 43/12*** | (2022.01) |
| ***H04L 67/01*** | (2022.01) |

(52) U.S. Cl.

CPC .......... *H04L 43/16* (2013.01); *H04L 43/0817* (2013.01); *H04L 43/12* (2013.01); *H04L 67/01* (2022.05)

(58) Field of Classification Search

CPC ..... H04L 43/16; H04L 67/01; H04L 43/0817; H04L 43/12

USPC .......................................................... 709/224

See application file for complete search history.

(56) References Cited

U.S. PATENT DOCUMENTS

| | | | | |
|---|---|---|---|---|
| 6,662,217 | B1 | 12/2003 | Godfrey et al. | |
| 6,901,442 | B1 | 5/2005 | Schwaller et al. | |
| 9,021,438 | B2 | 4/2015 | Dayan | |
| 9,178,903 | B1 * | 11/2015 | Kaplan | H04L 63/1433 |

(Continued)

OTHER PUBLICATIONS

GitHub Netflix/chaosmonkey resiliency tool, 3 pages, printed Feb. 3, 2021 from URL: https://github.com/Netflix/chaosmonkey.

(Continued)

*Primary Examiner* — Christopher B Robinson
*Assistant Examiner* — Chong G Kim
(74) *Attorney, Agent, or Firm* — Banner & Witcoff, Ltd.

(57) ABSTRACT

A computing system may comprise a monitoring server system, a target server system, and client devices that may be connected via one or more networks. The monitoring server system may identify client devices to perform a test on the target server system, and may send a payload with instructions for performing the test to the clients. The client devices may determine that the payload is authentic and execute the instructions in the payload, as part of a non-malicious botnet, to perform the test on the target server system. The monitoring server system may receive client-side results from the client devices, and server-side results from the target server system. The monitoring server system may generate a report based on the received results. The report may indicate one or more issues, points of failure and/or recommendations for mitigating the issues and/or points of failure.

20 Claims, 4 Drawing Sheets

(56) References Cited

U.S. PATENT DOCUMENTS

| | | | | |
|---|---|---|---|---|
| 10,210,074 | B1 * | 2/2019 | Szerenyi | G06F 11/3688 |
| 10,353,804 | B1 * | 7/2019 | Kandru | G06F 11/3698 |
| 10,534,701 | B1 * | 1/2020 | Pande | G06F 16/284 |
| 10,733,073 | B1 * | 8/2020 | Watts | G06F 11/3414 |
| 2003/0074606 | A1 | 4/2003 | Boker | |
| 2005/0216234 | A1 | 9/2005 | Glas et al. | |
| 2009/0055522 | A1 | 2/2009 | Shen et al. | |
| 2010/0325615 | A1 | 12/2010 | Ramot | |
| 2011/0145795 | A1 | 6/2011 | Khanapurkar et al. | |
| 2013/0024845 | A1 * | 1/2013 | Lanzkron | G06F 11/3419 717/130 |
| 2013/0311832 | A1 | 11/2013 | Lad et al. | |
| 2014/0026122 | A1 | 1/2014 | Markande et al. | |
| 2014/0082737 | A1 * | 3/2014 | Beskrovny | H04L 63/1433 726/25 |
| 2015/0106943 | A1 * | 4/2015 | Tripp | G06F 21/577 726/25 |
| 2015/0169434 | A1 * | 6/2015 | De Angelis | G06F 11/3688 717/124 |
| 2015/0256553 | A1 * | 9/2015 | Tripp | H04L 63/1458 726/23 |
| 2016/0191349 | A1 | 6/2016 | Buege | |
| 2016/0241582 | A1 * | 8/2016 | Boia | H04L 63/1433 |
| 2016/0337216 | A1 * | 11/2016 | Kaushik | H04L 43/50 |
| 2016/0371177 | A1 * | 12/2016 | Aiello | G06F 11/3433 |
| 2017/0046254 | A1 * | 2/2017 | Buege | G06F 11/3684 |
| 2018/0176117 | A1 * | 6/2018 | Gudetee | H04L 41/145 |
| 2019/0377663 | A1 * | 12/2019 | Szerenyi | G06F 11/3672 |
| 2021/0089438 | A1 * | 3/2021 | Gardner | G06F 11/3688 |
| 2021/0194782 | A1 * | 6/2021 | Jump | H04L 43/0864 |

OTHER PUBLICATIONS

AWS Webpage—Introducing Distributed Load Testing v1.3, May 21, 2021, 1 page—URL: https://aws.amazon.com/about-aws/whats-new/2021/05/introducing-distributed-load-testing-v1-3/.

Ajay Swamy and George Lenz, Ensure Optimal Application Performance with Distributed Load Testing on AWS, AWS Architecture Blog, May 13, 2021, 5 pages—URL: https://aws.amazon.com/blogs/architecture/ensure-optimal-application-performance-with-distributed-load-testing-on-aws/.

Glenn Lee, "Testing DDOS Protection Using a Stress Testing Solution," Performance Testing, Tech Tips, LoadView by Dotcom-Monitor Webpage, Feb. 28, 2021, 9 pages, URL: https://www.loadview-testing.com/blog/testing-ddos-protection-using-a-stress-testing-solution/.

Max Pritchard, "Guide to DDOS Mitigation and Testing," Cyber Security Review, Mar. 2017, 10 pages, URL: https://www.cybersecurity-review.com/articles/guide-to-ddos-mitigation-and-testing/.

* cited by examiner

SYSTEM FOR CREATING RANDOMIZED SCALED TESTING

CROSS-REFERENCE TO RELATED APPLICATION(S)

This Application is a divisional of U.S. application Ser. No. 17/346,857, filed on Jun. 14, 2021. The entirety of U.S. application Ser. No. 17/346,857 is incorporated herein by reference.

TECHNICAL FIELD

The present disclosure is generally related to the testing of computer systems.

BACKGROUND

Computer systems may comprise one or more servers that may serve data in response to requests received via a network from one or more client devices. In some cases, the servers may provide a variety of different services that work in concert to execute an application that may provide resources to client devices based on such requests.

Such client devices may comprise mobile devices, that may request resources from the one or more servers. The client devices and servers may send data via one or more networks, such as a combination of wired networks (e.g., Ethernet and/or fiber optic networks), and/or wireless networks, such as Wi-Fi and/or cellular networks, as some examples.

In some instances, a failure may occur that may prevent a client device or a server from receiving requested resources. For example, a service executing on a server, and which provides resources to a client, may fail. Additionally or alternatively, a component of a network may fail. As yet another example, a component of an application executing on a client device may fail, which may prevent the application from communicating with a server. Such systems that involve communications via a network among client devices and one or more servers may fail in numerous other manners as well.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding methods, apparatus, systems, and computer-readable media are also within the scope of the disclosure.

Systems described herein provide one or more client devices that may perform a test on a target server system that may be configured to replicate a production server system. The client devices may be client devices that utilize the production server system. The monitoring server system may identify client devices that are to perform the test, and may send a payload to the identified client devices. The payload may comprise instructions to perform the test and that are executable by an application executing on the client device. The client devices may be identified based on one or more characteristics. For example, client devices may be identified based on their hardware configuration, cell phone carrier, and/or being located at, or near, a geographic location.

To cause the client devices to perform the test, a monitoring server system may send a payload to the client devices. The client devices may receive the payload, which may indicate parameters for performing the test. The client devices may execute an application that may execute the instructions of the payload, which may cause the client devices to perform the test on the target server system. Thus, because the client devices may be partially under the control of the monitoring server system, the client devices may be configured as a sort of non-malicious botnet.

By utilizing actual client devices, and by identifying client devices having certain characteristics, the monitoring server system may configure and cause execution of a test that may identify issues and points of failure better than existing testing techniques. Existing testing techniques may use computing devices that are on a same network as the server system to perform a test of a target server system. Thus, using existing techniques it may not be possible to test the performance and/or reliability of networks external to the network of the target server system. For example, existing testing techniques may not be able to test the reliability of a third-party network, such as a cell phone carrier and/or an internet service provider (ISP) that clients may use to communicate with the target server system. Additionally, existing testing devices may be high-performance computing devices, such as servers. Such high-performance testing devices may be unrepresentative of actual client device hardware.

The techniques of this disclosure may also enable other testing capabilities that better simulate real-world conditions. For example, the monitoring system may select client devices from around the country or the world to perform a test of a target server system. For instance, selecting geographically diverse client devices for a test may be used to simulate a spike in web traffic, for example, during a busy shopping holiday. As another example, client devices at, or near, a location may be selected to perform a test, such as simulating conditions of a busy sporting event during which many mobile client devices are located in one geographic area. Existing testing techniques may not be able to accurately simulate such scenarios because they may not be able to utilize devices that are located at a particular geographic location to perform the test.

The testing techniques of this disclosure may also demonstrate issues that may not occur when using existing testing techniques that do not involve actual client devices. Some examples of such failures may include: network failures, such as overloaded cell towers, overloaded internet service providers (ISPs), problems with client devices themselves, and/or excess server load. Thus, the techniques of this disclosure may allow for creation, deployment, and/or execution of tests that may produce such conditions and thereby identify points of failure that are more likely to occur under real-world conditions. Further, by identifying such additional issues, such as points of failure, these issues may be proactively addressed to prevent and/or address such issues before or when they occur, thereby improving the reliability of computing systems that are subject to the testing techniques described herein.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
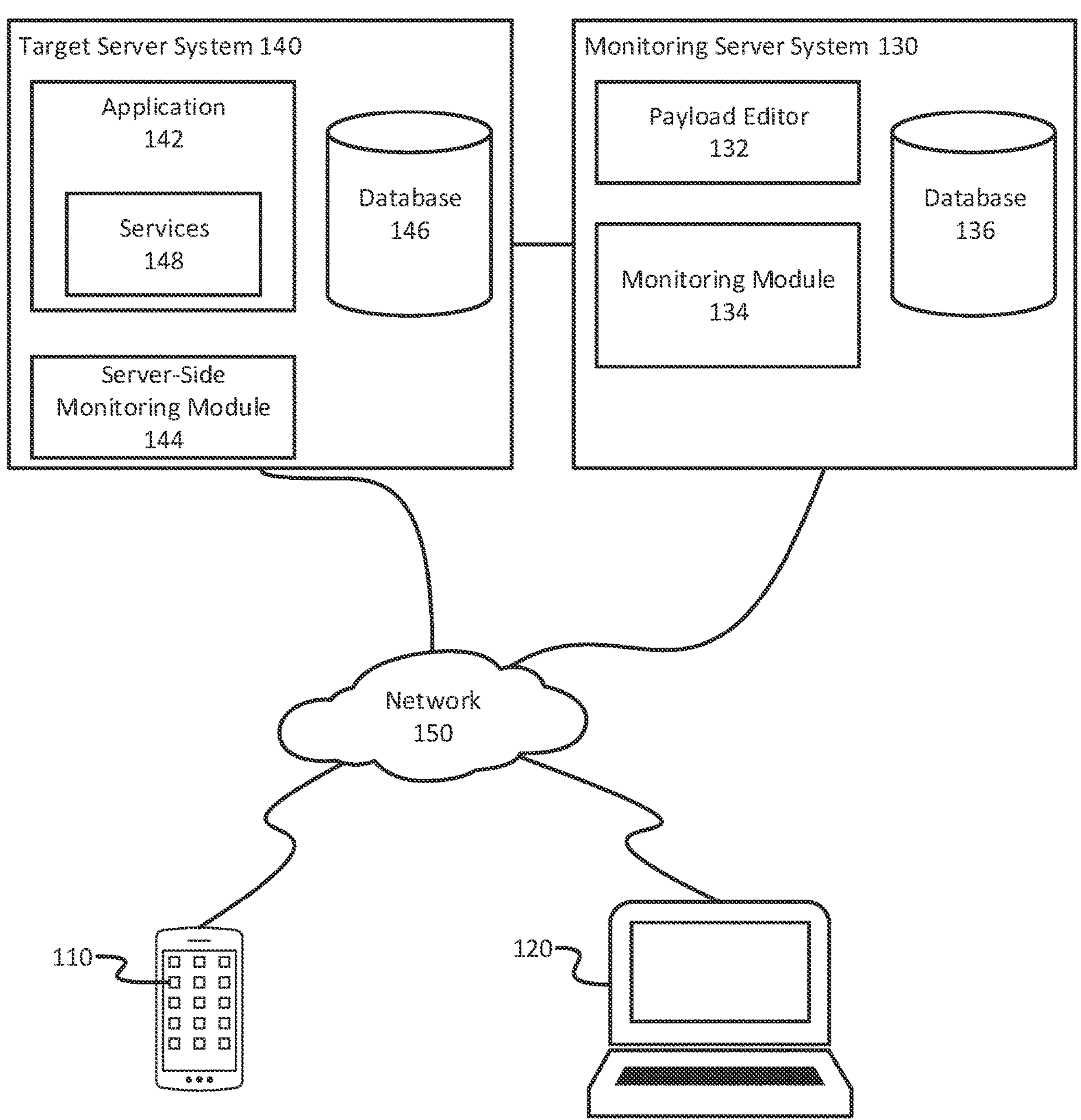
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for testing computer systems. Testing such systems may generally involve identifying one or more computing resources to be tested and/or monitored, and using other computing devices to perform a test. Such a test may involve various functions, such as data transfers, processing, requests for resources, and/or various other functions, that may utilize, or be associated with, the computing resources to be tested. As an example, one or more computing devices may generate large numbers of requests for resources of an application executing on one or more servers. These large numbers of requests may simulate high load conditions, which may be commonly referred to as a "load test." During a load test, as load increases on the one or more servers, failures and/or other issues may result from the load applied to the servers and other components under test. The results of such a load test may allow the designers and/or system administrators to determine how to scale their applications to address these failures and issues.

Performing testing of an application using existing testing techniques typically does not model real-world world conditions for a number of reasons. For instance, production server systems may be configured with distributed denial of service (DDoS) protection that may block load from a large number of client devices from reaching the servers. So, with existing testing techniques, the system under test must disable DDoS protection, which results in the testing environment differing significantly from a production environment.

Also, the testing devices that carry out such testing fail to model real-world client devices for a variety of reasons. As one example, testing devices selected for testing a target server system may be owned by the same organization that controls the target server system, and so may generally be on a same network as the target server system. For instance, all the testing devices used to test a target system may be on a same corporate network or even in a same data center. Devices performing such tests may not be connected to a wide variety of different internet service providers (ISPs) and/or cellphone carriers, and would not accurately represent types of client devices, and network connections that typically communicate with production servers. The techniques of this disclosure solve at least the aforementioned problems associated with existing techniques for testing computer systems.

Aspects of this disclosure may allow for the creation and execution of tests that more accurately simulate real-world conditions at least in part by selecting and/or utilizing actual client devices to perform tests on a target server system. Such client devices may execute an application associated with the target server system, as an example. These selected client devices may perform a test on the target server system, which may identify issues and/or points of failure resulting from the test, which may not be identified using existing testing techniques. For instance, because the devices that perform the test may be actual client devices, the client devices may be more representative of real-world client devices than devices used to perform testing when using existing testing techniques.

Such client devices may communicate with the target server system via a variety of different internet service providers and/or other communication networks, which may more accurately represent actual traffic patterns for an application. Existing load testing techniques may rely on load-generating devices that are connected on a same network as the target server system. For example, the load-generating testing devices may be located in a same data center as the target server system or may be connected through a same ISP as the target server system. As such, the techniques of this disclosure may test the capacity and/or reliability of external networks that existing testing techniques may lack.

The client devices used to perform testing in accordance with this disclosure may also be geographically distributed in manners that better simulate real-world conditions. While existing testing devices may always have network connectivity as a consequence of being on a same network or co-located with the target server system, actual client devices may have unreliable network connections. For example, during a sporting event, many client devices may be located at or near a same location, such as a sports venue. These client devices may have poor network connectivity as a result of a congested cell tower or other congested network associated with the sports venue (e.g., a Wi-Fi network). In order to test the impact of such poor network connectivity, client devices located at or near the venue may be selected to perform a test on a target server system. Performing a simulation of such poor network connectivity may not be possible using existing techniques. Based on the results of such a simulation, problems that may occur under such conditions, such as overly-congested cell towers, Wi-Fi networks, ISPs, third-party systems, and the like, may be identified. Identifying such problems may allow application designers and/or system administrators to address such problems.

The client devices, target server system, and/or monitoring server system may generate results as part of executing the test. A monitoring server system may receive these server-side and/or client-side results. The monitoring server system may combine and/or compare the results to determine issues resulting from the test, and to make recommendations. Such issues may include performance characteristics of the target server system under test conditions, and/or any observed failures. The recommendations may suggest one or more actions to take to resolve the identified issues. Based on the reported issues, and/or recommendations, application designers may better understand the behaviors of their applications and may be able to tune and/or re-design their applications to have better performance, reliability, scalability, and/or serviceability, as some examples.

The techniques of this disclosure solve the aforementioned problems associated with existing dialog generation systems.

Operating Environments and Computing Devices

FIG. 1 shows an operating environment 100. The operating environment 100 may include at least user client device 110, user client device 120, monitoring server system 130, and target server system 140, in communication via network 150. It will be appreciated that the network connections shown in relation to network 150 are illustrative and any means of establishing a communications link between the computers may be used. The existence of any of various network protocols such as TCP/IP, Ethernet, FTP, HTTP and the like, and of various wireless communication technologies such as Bluetooth, GSM, CDMA, 3GPP protocols, WiFi, LTE, and/or 5G, is presumed, and the various computing devices described herein may be configured to communicate using any of these network protocols or technologies. Any of the devices and systems described herein may be implemented, in whole or in part, using one or more computing systems described with respect to FIG. 2.

Client devices 110, 120 may provide data to, request data from, and/or interact with target server system 140 and/or monitoring server system 130. Examples of client devices 110 and 120 may comprise computing devices, such as smartphones, tablets, laptops, wearable devices, or various other forms of computing devices as well. Access to monitoring server system 130 and/or target server system 140 and/or resources thereof may be restricted to certain ones of client devices 110, such as client devices that provide certain credentials for authenticating users of those client devices. Client devices 110, 120 may be devices that are associated with target server system 140.

Monitoring server system 130 may comprise one or more computing devices, such as servers, which may include processors and/or memory and that may be configured to execute a variety of different applications and/or components. Monitoring server system 130 monitoring system may be configured to setup, deploy, and/or monitor a test of another computing system, such as target server system 140.

Monitoring server system 130 may comprise components and/or associated applications such as payload editor 132, monitoring module 134, and/or database 136. Payload editor 132 may generate a testing payload for performing a test. In some examples, the payload may be configured by a user, such as an administrator. Payload editor 132 may be executed on monitoring server system 130, and/or on a client device. Payload editor 132 may comprise a GUI interface that may receive user inputs that indicate instructions for a test to be performed by one or more client devices, as an example. Additionally or alternatively, payload editor 132 may comprise a text-based interface, with which a user may input code (e.g., a programming language source code) that may indicate such instructions for a test.

Payload editor 132 may also generate and/or associate credentials with a payload. Such credentials may be used to determine that the payload is authentic. Some examples of these credentials may comprise: a token, an application program interface (API) key, a cryptographic key, a signature, and/or a certificate. Such credentials may take other forms as well. In the case of a certificate, monitoring server system 130 may act as a certificate authority, and may sign a payload with a certificate associated with monitoring server system 130.

Monitoring module 134 may be configured to identify client devices that are to receive a payload, and to deploy a payload to the identified client devices, such as client devices 110, 120. Client devices for payload deployment and/or test execution may be identified in a variety of different manners. Monitoring server system 130 may maintain a data store (e.g., database 136) of all currently available client devices, as well as characteristics of the available client devices. From the store of all currently available client devices, a subset of all available client devices may be identified for test deployment and/or execution. This subset of client devices may be identified based on one or more characteristics associated with the client devices. Monitoring module 134 may receive such criteria, for example via user input (e.g., via a GUI, command-line input, and/or database query). As some examples, client devices may be identified based on criteria such as: hardware configuration, operating system, software configuration (e.g., web browser and/or mobile application), geographic location, cell phone carrier, ISP, cell phone tower, IP address, network connectivity, and/or various other factors as well.

Monitoring module 134 may deploy the payload to each identified client device. Deploying a payload to a client device may take various forms. In some examples, monitoring server system 130 may send the payload to the identified client devices via network 150. Such sending may involve sending the payload through a content distribution network or through a peer-to-peer network, as some examples. Additionally or alternatively, a payload may be embedded within a web page, and a client device that visits that web page may receive the payload. Monitoring module 134 may also send authentication information for the payload to the client devices in a manner similar to which the payload is sent.

Monitoring server system 130 (e.g., monitoring module 134 executing on monitoring server system 130) may also send an indication to the identified client devices to begin performing the test, which may comprise an indication to execute the payload instructions. Monitoring module 134 may also send authentication information for the indication to the identified client devices.

Before, during and/or after a test is being performed, monitoring module 134 may determine and/or receive client-side test results from the client devices and/or server-side test results from target server system 140. Monitoring module 134 may monitor different components that may be involved in or associated with such a test. For instance, monitoring module 134 may monitor characteristics associated with client devices 110, 120, network 150, and/or target server system 140, as some examples. Such characteristics may include performance characteristics, network characteristics, and/or component characteristics, as just some examples. Monitoring module 134 may monitor other characteristics as well.

Performance characteristics that monitoring module 134 may monitor may include resource utilization (e.g., processor, memory, storage utilization, and/or caching utilization), system response times (e.g., response time latencies, time to spin-up an instance), and the like. Monitoring module 134 may determine metrics for such performance characteristics, such as one or more averages, means, medians, modes, standard deviations, and/or distributions, as some non-limiting examples. Monitoring module 134 may determine various other performance characteristics and/or metrics as well.

Monitoring server system 130 may execute database 136, which may be an in-memory database that may offer faster database reads and writes as compared to databases that are not in-memory. Examples of such databases may include, but are not limited to relational databases, hierarchical databases, distributed databases, in-memory databases, flat file databases, XML databases, NoSQL databases, graph databases, and/or a combination thereof. Monitoring module 134 may store test results in database 136 in some examples. Monitoring module 134 may store test results in various other forms and/or data sources as well.

Target server system 140 may comprise components and/or associated applications such as application 142, sever-side monitoring module 144, and/or database 146. Target server system 140 may comprise one or more computing devices, such as servers, having one or more processors and memory. Target server system 140 may be connected via network 150 with client devices 110 and 120. Additionally or alternatively, target server system 140 may be connected with monitoring server system 130 via a private network link. For example, monitoring server system 130 and target server system 140 may be on a same local area network or intranet.

Target server system 140 may execute an application 142. Application 142 may be any type of application, such as web application, database application, and/or mobile application backend. Application 142 may take various other forms as well. As an example, application 142 may be associated with a mobile application that executes on mobile devices, such as client devices 110 and/or 120. As another example, application 142 may host and/or serve one or more web pages to client devices. In some instances, application 142 may comprise one or more services 148 that may execute on target server system 140. These services may be configured to perform different functions associated with application 142. For instance, there may be an authentication service that authenticates users to application 142, a backend service that handles backend communications with a database, such as database 146, and/or a front-end service that handles generation of front-end content for application 142. Services 148 may include other services and may have various other configurations as well.

Target server system may execute database 146, which may be an in-memory database that may offer faster database reads and writes as compared to databases that are not in-memory. Examples of such databases may include, but are not limited to relational databases, hierarchical databases, distributed databases, in-memory databases, flat file databases, XML databases, NoSQL databases, graph databases, and/or a combination thereof. Application 142 and/or server-side monitoring module may store data in database 146. For example, server-side monitoring module 144 may store test results in database 146.

Target server system 140 may be configured to simulate or closely reproduce a production environment for executing application 142. A production environment may have certain features, such as debugging features, performance monitoring features, and/or other features, disabled for performance and/or security purposes. Application 142 may be executed in a quality assurance (QA) environment rather than a production environment. Such a QA environment may be configured with greater logging, debugging, and/or performance monitoring capabilities as as compared to a production environment.

Target server system 140 may execute server-side monitoring module 144. Server-side monitoring module 144 may monitor various characteristics before, during, and/or after a test, but from the perspective of target server system 140. As discussed above with respect to monitoring server system 130, such characteristics may include performance characteristics, network characteristics, and/or component characteristics, as some non-limiting examples.

Examples of such performance characteristics may include resource utilization (e.g., processor, memory, storage utilization, and/or caching performance), and/or system response times (e.g., response time latencies, time to spin-up a new instance of one of services 148 and/or a virtual machine instance) of target server system 140. Server-side monitoring module 144 may obtain and/or calculate various other metrics, such as one or more averages, means, medians, modes, standard deviations, and/or distributions of one or more characteristics, as some non-limiting examples.

As discussed above, a number of client devices (e.g., client devices 110, 120) may be identified by monitoring server system 130 to perform a test on target server system 140. The identified client devices may receive a payload with instructions for performing the test from monitoring server system 130. The client devices may also receive information for authenticating the payload from monitoring server system 130. The authentication information may be part of the payload in some examples.

The identified client devices may receive an indication to begin performing the test. The client devices may receive such an indication from monitoring server system 130, as an example. A client device receiving an indication to begin the test may determine whether the indication is authentic, for example, based on the authentication information. If the indication to begin performing the test and/or the payload is determined to be authentic, the client device may begin performing the test.

The client devices (e.g., client devices 110 and/or 120) may execute an application to perform the test. Such an application may take various forms. In some examples, the payload itself may comprise an application that a client device may execute. As another example, the application may be a mobile application, desktop application, and/or command-line application, and the payload may comprise instructions, such as source code, byte code, and/or object code, that may integrate with the application to cause the client device to perform the test. As an example, such an application may be configured to execute the payload code as part of executing the application. For instance, a payload may function as a plugin to the application, which may be the same or similar to a web browser plugin or extension. Additionally or alternatively, the payload may also comprise code that may be received by the client device as part of loading a web page. For instance, the payload may comprise JavaScript code or other programming language source code that a web browser may execute as part of retrieving, loading and/or rendering a web page. A payload may take various other forms as well.

As part of performing the test based on a payload, the client devices may perform actions based on instructions of the payload. As some examples, these actions may include requesting a resource from one or more computing devices, such as target server system 140. The instructions may specify a frequency for such actions in some cases. For example, payload instructions may cause a client device to ping and/or request a web page or other resource from target server system 140 once every second or once every 30 seconds. A payload may cause a client device to perform various other actions as well.

Target server system 140 may be configured to block network traffic of any test that is not determined to be authentic. To authenticate a test, client devices may provide the payload authentication information to target server system 140. Target server system 140 may allow a test to proceed, for example, based on receiving authentication information and determining that the test is authentic based on the authentication information. Client devices 110 and/or 120 may provide the authentication information to target server system 140 before beginning such a test in some examples. Additionally or alternatively, monitoring server system 130 may provide the authentication associated with a test to target server system 140. Target server system 140 may allow a test to proceed based on the authentication information received from monitoring server system 130.

The payload instructions may also define characteristics for a client device to monitor during and/or after performing a test. Examples of such performance characteristics may include resource utilization (e.g., processor, memory, storage utilization, and/or caching performance), response times (e.g., response time latencies from target server system 140), network connectivity and/or throughput as measured by the client devices. Such payload instructions may cause a client device to monitor various other performance characteristics as well. Client devices may send test results to monitoring server system 130. Such test results may comprise characteristics that the client devices monitored.

At some point after beginning a test, the client devices may terminate the test. Client devices may terminate a running test based on various conditions. As one example, the client devices may receive an indication from monitoring server system 130 and/or target server system 140 to terminate the test. Additionally or alternatively, the payload itself may include one or more conditions for terminating the test, such as a timeout condition, identification of a failure, and/or a number of iterations being completed, as some non-limiting examples. Tests may be terminated based on various other conditions as well.

After a test has been completed, monitoring server system (e.g., monitoring module 134 executing on monitoring server system 130) may generate a report of the test results. The report may be based on combing, analyzing, and/or comparing test results received from target server system 140, client devices 110 and 120, and/or determined by monitoring server system 130 itself. In some examples, such issues may be identified using machine learning. The report may identify issues that occurred during and/or as a result of the test. Examples of such issues may include: network issues, performance issues, loss(es) of connectivity, failures (e.g., application, and/or service failures), and/or other issues. Such reports may take various other forms, and may be generated in various other manners as well.

Various computing devices are described as performing functions described in the context of operating environment 100. However, it should be noted that any computing device or combination of computing devices in the operating environment 100 may perform any of the processes and/or store any data as described herein The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in data transfers to protect the integrity of the data such as, but not limited to, Secure File Transfer Protocol (SFTP), and/or Pretty Good Privacy (PGP) encryption. In many embodiments, one or more web services may be implemented within the various computing devices of operating environment 100. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
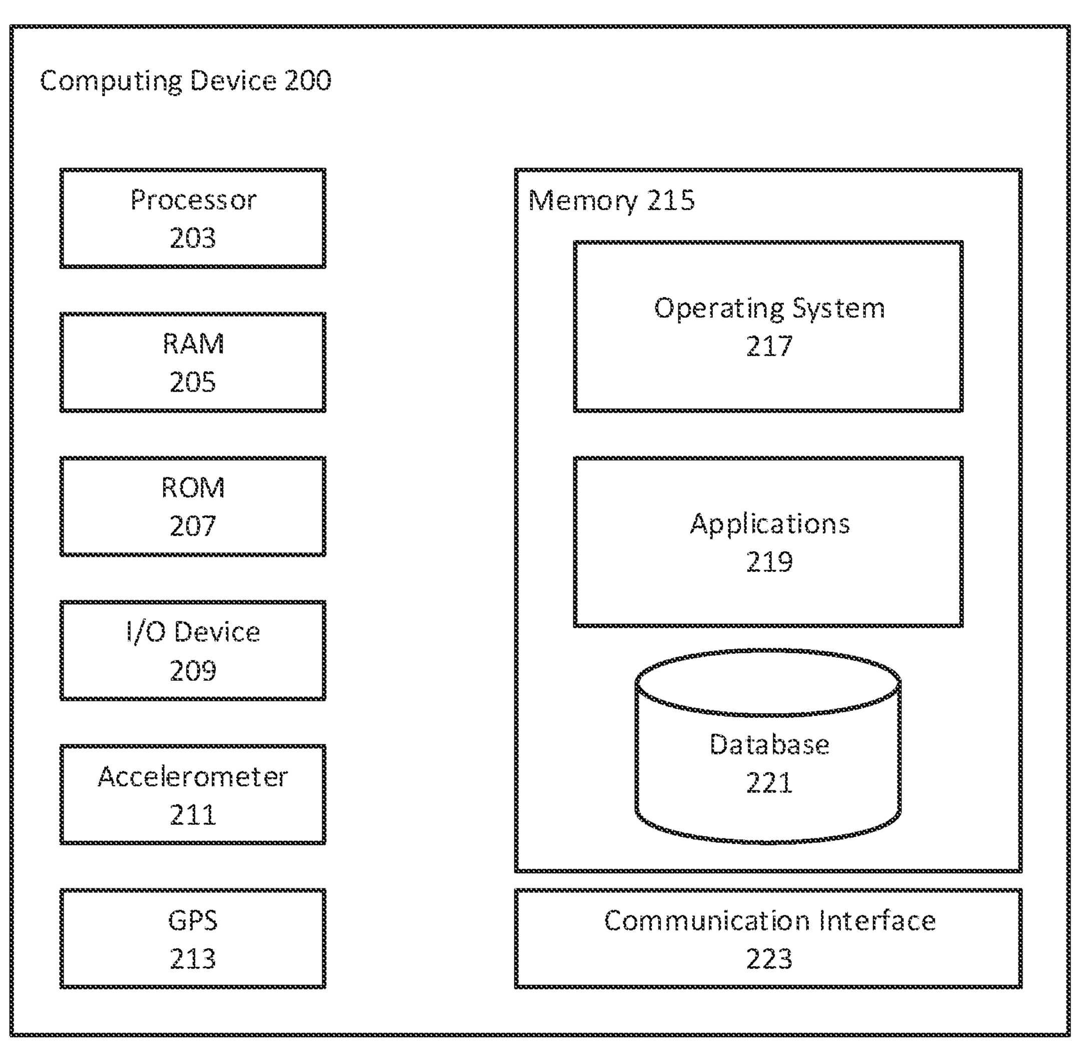
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, LTE, and 5G is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Testing Flows

Figure 3:
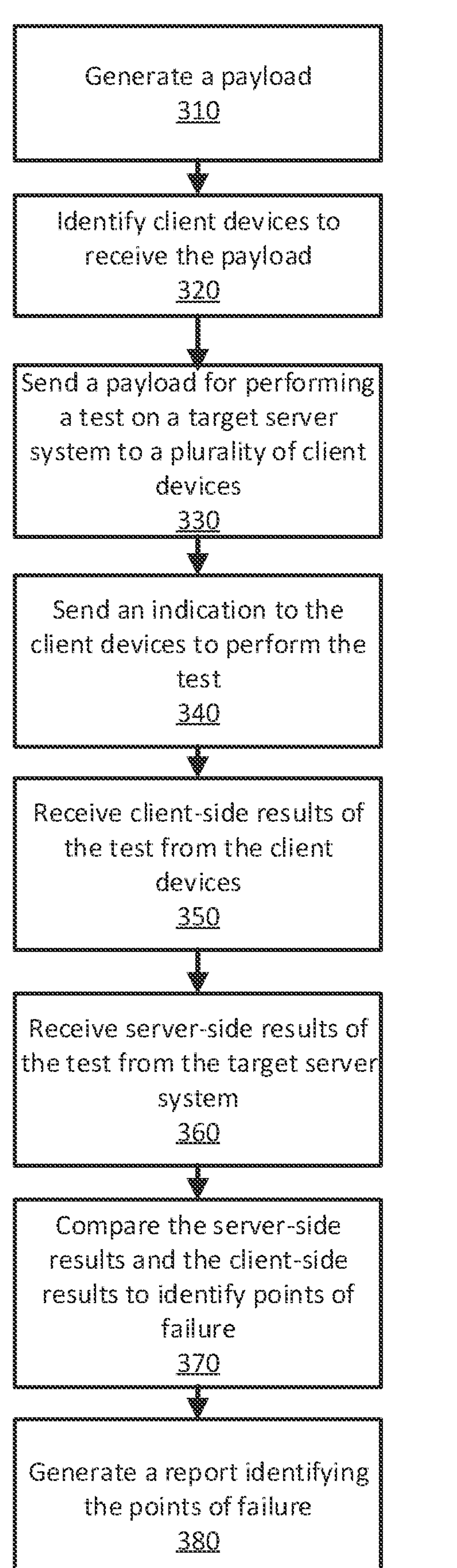
FIG. 3 shows a flow chart process for deploying and/or causing execution of a test in accordance with one or more aspects described herein.

As described above, a monitoring server system (e.g., monitoring server system 130) may be used to create, deploy, and/or execute a test on a target server system (e.g., target server system 140). FIG. 3 shows a flow chart of a process for deploying and/or causing execution of such a test. Some or all of the steps of process 300 may be performed using one or more computing devices as described herein. In a variety of embodiments, some or all of the steps described below may be combined and/or divided into sub-steps as appropriate.

At step 310, a computing device (e.g., payload editor 132 executing on monitoring server system 130) may generate a payload for performing a test. In some examples, the payload may be received from another computing device, such as one of client devices 110 or 120. The payload may comprise instructions (e.g., source code written in a programming language, such as JavaScript) that indicate one or more actions for one or more client devices to perform when executing the payload.

For instance, the one or more actions may comprise resources to monitor, resources to request from a target server system, a frequency for performing actions, and/or conditions for terminating the test, as some non-limiting examples. The payload may also indicate the target server system, for example by including one or more IP addresses, and/or universal resource indicators (URIs) associated with the target server system (e.g., target server system 140). In some examples, the payload may comprise authentication information that a client device may use to determine that the payload is authentic.

In some examples, configuring the payload may involve a computing device (e.g., a target server system) customizing the payload. Customizing the payload may comprise various aspects. For instance, a payload may be customized to the application, operating system, and/or hardware of the one or more client devices to which the payload may be deployed. Such customization may involve compiling some or all of the payload (e.g., into byte code and/or object code) in some cases. A computing device (e.g., payload editor 132 and/or monitoring module 134 executing on monitoring server system 130) may determine such client-specific payload customizations based on characteristics of the client devices, which may be retrieved from a datastore, such as database 136.

At step 320, the computing device may identify one or more client devices that are to receive the payload. Identifying the client devices may be based on characteristics of the client devices. Such characteristics of the client devices may include: hardware, software (e.g., applications operating system), type of application (e.g., web browser, mobile application, etc.) used to access a back-end server, cellular carrier, currently-connected Wi-Fi network, geographic location, and/or ISP as some non-limiting examples. These client device characteristics may be stored in and retrieved from database 136 and/or another data store.

In some instances, client devices may be identified in order to simulate various conditions. For example, a user may wish to test the performance of an application (e.g., application 142 executing on target server system 140) for devices connected via a specific network provider (e.g., a particular ISP or cellular carrier), and may select mobile devices (e.g., a subset of all client devices) connected to that network provider to receive the payload. As another example, a user may wish to simulate network conditions at a crowded sports stadium, and may select only a subset of client devices that are currently located at a geographic location associated with the sports stadium. As still another example, a user may wish to test the application performance of a particular client device hardware configuration, and may select devices having that hardware configuration to perform the test. The preceding are just some examples of different possibilities for identifying mobile devices to receive a payload. Such client devices may be identified in various other manners and according to various other criteria as well.

At step 330, the computing device may send a payload for performing a test on a target server system to a plurality of client devices. In some examples, the computing device (e.g., monitoring server system 130) may send the payload to the client devices via a network, such as network 150. The payload may be sent via an encrypted connection for security and/or privacy reasons. The computing device may send the payload to an application executing on the client devices, such as a mobile application, desktop application, or another application (e.g., web browser). In some examples, the payload may be embedded within a web page, which may be hosted by the target server system (e.g., target server system 140). For instance, the payload may be JavaScript that is loaded with a web page. A client device may receive the payload when a web browser executing on the client device loads the web page.

At step 340, the computing device may send an indication to the identified client devices to execute the payload instructions and thereby perform the test. In some examples, the indication to execute the payload may comprise a date and/or time for the test to be performed. In this manner, the indication may be used to schedule a test to be performed at the indicated date and/or time. Such an indication may be a message that the computing device may send to the application executing on the client devices. The indication may be sent via an encrypted connection for increased security and/or privacy. The indication may also be associated with authentication information that indicates the authenticity of the indication and/or the payload, as some examples. For instance, the indication may be signed cryptographically by the computing device (e.g., monitoring server system 130)

At step 350, the computing device may receive client-side results of the test from the client devices. Before, during and/or after the test, the computing device (e.g., monitoring module 134 executing on monitoring server system 130) may receive client-side results of the test from the identified client devices that configured to perform the test. The computing device may store the received results in a database, such as database 136, or database 221, as some examples.

At step 360, the computing device may receive server-side results of the test from the target server system (e.g., from target server system 140). In some examples, the monitoring server system may be configured to obtain server-side statistics, such as performance statistics, from the target server system in real-time. The computing device may store the received server-side results in a database or another data store according to some examples.

At step 370, the computing device (e.g., monitoring module 134 executing on monitoring server system 130) may compare the server-side results and the client-side results. The comparison of server-side and client-side results may identify one or more points of failure. The computing device may compare the server-side and client-side results in various manners. For instance, the computing device may determine whether any monitored client-side and/or server-side characteristics exceed a threshold level. Additionally or alternatively, the computing device may determine whether any corresponding client-side and server-side monitored characteristics differ significantly from each other. Such differences may indicate an issue with a third-party component or point of failure. Example points of failure may include third-party networks, such as cellular carriers, ISPs, Wi-Fi networks, as some examples. As an example of identifying a point of failure, the computing device may determine that there is a large difference between server-side request response time and client-side time to receive a server response. This difference may indicate an issue with a network that connects the computing device and client device. The computing device may use various techniques to identify issues, such as points of failure. For instance, the computing device may use machine learning techniques, such as deep learning, gradient boosting, decision trees, clustering, supervised or unsupervised learning, neural networks, and/or any other combination of machine learning techniques to identify issues and/or points of failure.

At step 380, monitoring server system may generate a report indicating any identified issues, which may include points of failure. The report may provide a human-readable summary of any such identified issues, as a non-limiting example. For instance, if the comparison of client and server-side results may indicate that the target server system had scalability issues resulting from excessively long instance spin-up times, the report may state such issues in plain English (e.g., "scalability issues:excessively long instance spin-up times:average 5-minute spin-up time"). The report may also include recommendations for remedying such issues (e.g., "consider lowering threshold for spinning up a new instance.") As another example, in the case of performance issues caused by many users connected to the same cell tower, the report may state "many client devices were connected to a congested cell phone tower." The report may also indicate additional information associated with the congested cell-phone tower, such as its geographic location, and/or the carrier that owns the tower, as some examples. The report may indicate various other issues and/or issues types in various other formats as well.

By reading the report generated in step 380, users, such as administrators and/or designers of the application executing on the target server system, may gain a greater understanding of issues that affect the application, target server system, and/or a production server system that target server system 140 is configured to reproduce. Based on the report, users may take actions to address and/or improve the performance, reliability, serviceability, and/or availability of the application, target system, and/or production server system, such as re-designing and/or re-configuring application behavior, hardware, and/or network behavior, as some non-limiting examples.

Figure 4:
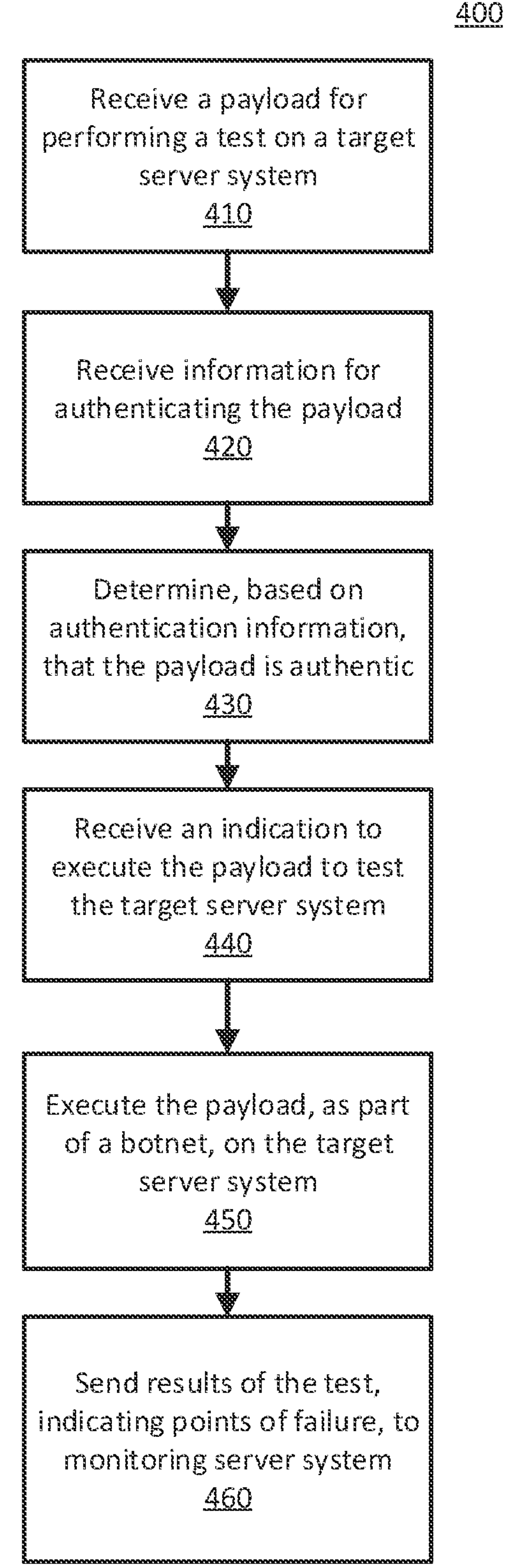
FIG. 4 shows a flow chart of a process for performing a test based on a received payload in accordance with one or more aspects of the disclosure.

As noted above, client devices, such as client devices 110 and/or 120, may be configured to perform a test on a target server system. Such client devices may perform a test based on payload a payload comprising instructions. FIG. 4 shows an example process for performing such a test based on a payload. Process 400 may begin at step 410. At step 410, a client device (e.g., client devices 110 and/or 120) may receive a payload for performing a test on a target server system. As explained above, such a payload may comprise instructions for an application to perform a test on a target server system.

In some examples, the payload itself may be an executable application (e.g., an application written JavaScript, etc.). In some examples, an application executing on the client device may receive the payload. Such an application may be a mobile application, and/or desktop application as some examples. The application executing on the mobile device may integrate the payload into the application for execution. For instance, the payload may function as a plugin for the application. In some examples, the client device may compile the payload at run-time. In some examples, the client device may execute a web browser that may request a web page from an application (e.g., application 142). This application may be served by a target server system (e.g., target server system 140) that may be configured to execute an application in a QA environment. Such a QA environment may be configured to reproduce or simulate a production environment. Such a QA environment may also have greater debugging, performance monitoring, and/or error reporting capabilities enabled, as compared to a production environment. The client device may be unaware that it is communicating with target server system 140 rather than a production server system in some examples.

A client device may receive a payload from a web page that is hosted by the target server system. The web page received from the target server system may include a payload for performing a test on a target server system. Such a payload may take the form of code included with the web page, such as JavaScript code, as a non-limiting example. In the case of JavaScript code within a web page, the web browser may compile the JavaScript into an executable format that the web browser may execute. The client device may receive a payload in various other manners as well.

In some cases, a user of a client device that receives the payload may be notified that the payload has been received, and that a monitoring server system is requesting to use resources of an executing application to perform a test on a target system. The user may be able to accept or decline the request to perform the test in some examples. In other examples, a user of the client device may not be made aware that a payload has been received and/or that the client device may be configured to perform a test.

At step 420, the client device may receive information for authenticating the payload. Such payload authentication information may be part of the payload itself or may be sent separately. Such authentication information may take various forms, such as one or more of: a token, an API key, a cryptographic key, a signature, or a certificate. Such an API key may grant client devices access to a particular API, such as an API that may be used by the client device to perform testing of a target server system, and/or an API that is used to access resources of an application hosted by the target server system. Such a cryptographic key may be used as part of a public key or shared key encryption scheme. The client device may use the cryptographic key as part of such an encryption scheme to authenticate the payload. In the case of a signature, a monitoring server system may utilize a cryptographic signature to sign the payload, for example in accordance with the Digital Signature Algorithm (DSA) or Edwards-curve Digital Signature Algorithm (EdDSA) as some examples. Other digital signature techniques may be utilized to authenticate the payload as well. In some cases, the payload may be associated with a certificate that the client may use to determine that the monitoring server system signed the payload. Payload authentication information may take various other forms as well.

At step 430, the client device may determine that the payload is authentic. The client device may determine that the payload is authentic by using the authentication information associated with the payload verify that the payload was generated by, and/or signed by, the monitoring server system, and has not been created by an entity that may attempt to use such payload execution capabilities for malicious purposes.

At step 440, the client device may receive an indication to execute the payload to perform the test on the target server system. In some examples, the indication to execution the payload may comprise an indication of a date and/or time at which the test is to be performed. In this manner, the indication may be used to schedule a date and/or time for the test to be performed. Such an indication to execute the payload may take various forms. As one example, a client device may receive such an indication from monitoring server system 130 and/or target server system 140. Such an indication may also be associated with authentication information that indicate the authenticity of the indication to perform testing.

Before executing a testing payload, the client devices may provide the authentication information, payload, and/or the indication to perform testing to the target server system. Providing such information to the target server system may inform the target server system that a test is about to occur, and may allow the target server system to determine that the test should not be blocked (e.g., may be allowed to proceed). Based on receiving such authentication information, the target server system may also determine the authenticity of the indication to perform the test, and/or payload. Based on determining that the payload and/or indication are authentic, the target server system may take various actions. For instance, the target server system may disable certain protections, such as DDoS protection, in order to allow the test to proceed (e.g., by allowing traffic from the client devices configured to execute the payload). The target server system may take other actions in response to determining that an indication, and/or payload are authentic as well.

At step 450, the client devices may execute the payload on the target server system. At step 450, the client devices, and/or at an application executing on the client devices, may be partially under the control of the monitoring server system. Thus, the client devices may form a non-malicious botnet when executing the payload to perform the test. To execute the payload, the client devices may perform actions indicated by the instructions in the payload. As explained above, such payload instructions may cause the client devices to request resources, monitor network conditions, and/or monitor client-side performance characteristics, as just some examples. As some further examples, the payload instructions, when executed by the application of the client device, may cause the client device to perform a load test, performance test, stress test, user experience test, and/or scalability test of the target server system, as just some examples.

Additionally or alternatively, the payload may comprise instructions that cause the client device to disable functionality of an application that is executing on the client device. For instance, a payload may cause the client device to disable JavaScript in a web browser executing on the client device, or to disable a service executing on the client device. Various other types of components may disabled as well. By disabling such client-side components, a test may simulate application behavior on client devices that have limited capabilities or increased privacy capabilities, as some examples.

At step 460, the client devices may send the client-side results of the test to monitoring server system 130. Client devices may send test results to the monitoring server system before the test has begun (e.g., to establish a baseline), while the test is being performed, and/or after the test has completed. In some examples, the payload may include instructions that indicate when and how to send results to the monitoring server system. As an example, such instructions may specify that the client device should send test results to a particular IP address and/or port number, that the results should be sent at a certain frequency and/or upon completion of the test. A client device may also send test results to the monitoring server system not based on payload instructions. For instance, a client device may send test results if a test is terminated by the client device (e.g., due to a timeout condition or error), as an example.

The client device may analyze the test results before sending the results in some cases. For instance, a client device may analyze the results to determine one or more points of failure that were identified when performing the test. Such points of failure may include third-party points of failure, which are not under the control of either the client device or the target server system. Examples of third-party points of failure may include cell phone networks, Wi-Fi networks, ISP connections, content distribution networks, or any other type of third-party component.

The client device may also determine from the test results that a particular component associated with the target server system has failed. Examples of such failed components may include a server, application, and/or service, as just some examples. A client device may identify such failed components based on instructions of the payload. That is, the payload may provide the client device with some knowledge about the components of the target sever system, (e.g., IP addresses, applications executing on the target server system, and/or services executed as part of the application), which the client devices may utilize to identify failed components.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, may be written in a markup language such as (but not limited to) HTML or XML, and/or in one or more scripting languages, such as JavaScript, TypeScript, Python, Ruby, Perl, and/or PHP. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above

What is claimed is:

1. A computing device comprising:

one or more processors; and memory storing instructions that, when executed by the one or more processors, cause the computing device to:

generate a payload comprising instructions for an application, executing on a plurality of client devices, to perform a test on a target server system, wherein the instructions cause the application, executing on the plurality of client devices, to send a request for at least one resource associated with the target server system;

identify, based on the plurality of client devices connected to the target server system, a subset of the plurality of client devices, wherein the subset has a first characteristic, and wherein the first characteristic is selected based on the generated payload;

send, to the application executing on the subset of the plurality of client devices, the payload;

send, to the application, an indication to perform the test on the target server system, wherein sending the indication causes the application to perform the test on the target server system by executing the payload via the subset of the plurality of client devices;

receive, from the target server system, server-side results of the test performed on the target server system;

receive, from at least two or more of the subset of the plurality of client devices, client-side results of the test performed on the target server system;

identify, based on response times, associated with the server-side results and the client-side results, to the request for the at least one resource satisfying a threshold, one or more points of failure associated with a network connection between the subset of the plurality of client devices and the target server system; and generate a report identifying the one or more points of failure associated with the network connection between the subset of the plurality of client devices and the target server system.

2. The computing device of claim 1, wherein the application executing on the plurality of client devices comprises at least one of:

a mobile application; or an executable associated with a web browser.

3. The computing device of claim 1, wherein the application executing on the subset of the plurality of client devices forms a botnet for performing the test.

4. The computing device of claim 1, wherein the instructions, when executed by the one or more processors, cause the computing device to:

send information for authenticating the payload to the application executing on the plurality of client devices, wherein sending the information for authenticating the payload and the indication to perform the test causes the subset of the plurality of client devices to:

determine that the payload is authentic; and based on the determination that the payload is authentic, execute the payload to perform the test on the target server system.

5. The computing device of claim 1, wherein the instructions, when executed by the one or more processors, cause the computing device to:

use a machine learning model to compare the server-side results and the client-side results and identify the one or more points of failure.

6. The computing device of claim 1, wherein the indication to perform the test includes a date and/or time at which the subset of the plurality of client devices is to perform the test.

7. The computing device of claim 1, wherein the test comprises a load test that applies increasing load to the target server system to cause the failure.

8. The computing device of claim 1, wherein the target server system comprises a non-production server system configured to replicate a production server system, and wherein the subset of the plurality of client devices is unaware that the target server system is the non-production server system.

9. A method comprising:

receiving, by an application executing on a client device and from a monitoring server system, a payload for performing a test on a target server system and information for authenticating the payload, wherein the payload comprises instructions that cause the application to send a request for at least one resource associated with the target server system;

determining, by the application and based on the information for authenticating the payload, that the payload is authentic;

receiving, by the application, an indication to execute the payload to perform the test on the target server system;

based on determining that the payload is authentic and the received indication to perform the test, executing the payload, as part of a botnet, to perform the test on the target server system;

identifying, by the application executing on the client device and based on executing the payload, one or more points of failure associated with a network connection between the client device and the target server system; and sending, by the application executing on the client device and to the monitoring server system, the identified one or more points of failure associated with the network connection between the client device and the target server system.

10. The method of claim 9, wherein performing the test comprises disabling functionality of the application executing on the client device.

11. The method of claim 9, wherein performing the test on the target server system comprises sending, to the target server system, the information for authenticating the payload to allow the test to be performed on the target server system.

12. The method of claim 9, further comprising:

determining that a component associated with the target server system has failed, wherein sending the identified one or more points of failure comprises sending an indication that the component associated with the target server system has failed.

13. The method of claim 9, further comprising:

using a machine learning model to compare server-side results and client-side results and identify the one or more points of failure.

14. The method of claim 9, wherein the indication to perform the test includes a date and/or time at which the client device is to perform the test.

15. The method of claim 9, wherein the test comprises a load test that applies increasing load to the target server system to cause the failure.

16. The method of claim 9, wherein the target server system comprises a non-production server system configured to replicate a production server system, and wherein the client device is unaware that the target server system is the non-production server system.

17. One or more non-transitory computer-readable media storing executable instructions that, when executed, cause a computing device to:

generate a payload comprising instructions for an application, executing on a plurality of client devices, to perform a test on a target server system, wherein the instructions cause the application, executing on the plurality of client devices, to send a request for at least one resource associated with the target server system;

identify, based on the plurality of client devices connected to the target server system, a subset of the plurality of client devices having a first characteristic, wherein the first characteristic is selected based on the generated payload;

send, to the application executing on the subset of the plurality of client devices, the payload;

send, to the application, an indication to perform the test on the target server system, wherein sending the indication causes the application to perform the test on the target server system by executing the payload via the subset of the plurality of client devices;

receive, from the target server system, server-side results of the test performed on the target server system;

receive, from each of the subset of the plurality of client devices, client-side results of the test performed on the target server system;

identify, based on response times, associated with the server-side results and the client-side results, to the request for the at least one resource satisfying a threshold, one or more points of failure associated with a network connection between the subset of the plurality of client devices and the target server system; and generate a report identifying the one or more points of failure associated with the network connection between the subset of the plurality of client devices and the target server system.

18. The one or more non-transitory computer-readable media of claim 17, wherein the application executing on the plurality of client devices comprises at least one of:

a mobile application; or an executable associated with a web browser.

19. The one or more non-transitory computer-readable media of claim 17, wherein the application executing on the plurality of client devices forms a botnet for performing the test.

20. The one or more non-transitory computer-readable media of claim 17, wherein executable instructions, when executed, cause the computing device to:

send information for authenticating the payload to the application executing on the plurality of client devices, wherein sending the information for authenticating the payload and the indication to perform the test causes the plurality of client devices to:

determine that the payload is authentic; and based on the determination that the payload is authentic, execute the payload to perform the test on the target server system.

* * * * *